(12) United States Patent
Shetty et al.

(10) Patent No.: US 12,081,501 B2
(45) Date of Patent: Sep. 3, 2024

(54) SMART EMAIL TEMPLATE GENERATION BASED ON ATTACHMENTS

(71) Applicant: VMWARE, INC.

(72) Inventors: Rohit Pradeep Shetty, Bangalore (IN); Ramanandan Nambannor Kunnath, Bangalore (IN)

(73) Assignee: Omnissa, LLC, Palo Alto, CA (US)

(*) Notice: Subject to any disclaimer, the term of this patent is extended or adjusted under 35 U.S.C. 154(b) by 0 days.

(21) Appl. No.: 17/961,629

(22) Filed: Oct. 7, 2022

(65) Prior Publication Data
US 2024/0022531 A1   Jan. 18, 2024

(51) Int. Cl.
*H04L 51/08*   (2022.01)
*H04L 51/234*   (2022.01)

(52) U.S. Cl.
CPC ........... *H04L 51/08* (2013.01); *H04L 51/234* (2022.05)

(58) Field of Classification Search
CPC ....... H04L 51/08; H04L 51/234; H04L 51/00; H04L 51/0843
See application file for complete search history.

(56) References Cited

U.S. PATENT DOCUMENTS

| | | | | |
|---|---|---|---|---|
| 6,453,338 B1* | 9/2002 | Shiono | ................. | G06Q 10/107 714/39 |
| 7,007,066 B1* | 2/2006 | Malik | ................. | G06Q 10/107 709/219 |
| 8,286,085 B1* | 10/2012 | Denise | ................. | G06Q 10/107 715/752 |
| 2002/0035576 A1* | 3/2002 | Kishimoto | ............ | H04L 51/066 |
| 2004/0006596 A1* | 1/2004 | Kato | ................. | H04N 1/00222 709/206 |
| 2006/0085513 A1* | 4/2006 | Malik | ................. | G06Q 30/0601 705/26.1 |
| 2006/0089772 A1* | 4/2006 | Otto | ....................... | B60K 28/04 701/50 |
| 2006/0089972 A1* | 4/2006 | Malik | ................... | G06Q 10/107 709/206 |
| 2006/0277263 A1* | 12/2006 | Daniels | ................ | G06Q 10/107 709/206 |
| 2011/0219083 A1* | 9/2011 | Nishi | ...................... | G06F 15/16 709/206 |
| 2012/0311583 A1* | 12/2012 | Gruber | ............ | G06Q 10/06311 718/100 |
| 2013/0159438 A1* | 6/2013 | Malik, Sr. | ............ | G06Q 10/107 709/206 |
| 2013/0227043 A1* | 8/2013 | Murakami | .............. | H04L 51/08 709/206 |
| 2014/0181223 A1* | 6/2014 | Homsany | ................ | H04L 51/08 709/206 |

(Continued)

*Primary Examiner* — Sargon N Nano
(74) *Attorney, Agent, or Firm* — Kim & Stewart LLP

(57) ABSTRACT

Disclosed are various embodiments of identifying a reusable email template for use in an email client based on a file attachment, an email recipient, and/or other factors, such as date and time. Various embodiments can identify an unsent email, the unsent email comprising at least a body and an attachment file, analyze the attachment file to determine one or more attachment categories, select an email template from a plurality of email templates based at least on the one or more attachment categories, and populate the body of the unsent email with the selected email template.

11 Claims, 6 Drawing Sheets

(56) References Cited

U.S. PATENT DOCUMENTS

| | | | |
|---|---|---|---|
| 2016/0050164 A1* | 2/2016 | Crisman | H04L 51/02 |
| | | | 709/206 |
| 2020/0396190 A1* | 12/2020 | Pickman | H04L 63/1483 |
| 2021/0124742 A1* | 4/2021 | Ahmed | G06F 16/24539 |
| 2021/0124752 A1* | 4/2021 | Swanson | G06F 16/254 |
| 2022/0067663 A1* | 3/2022 | Walters | H04L 51/04 |
| 2022/0083986 A1* | 3/2022 | Duffy | G06Q 10/1097 |

* cited by examiner

SMART EMAIL TEMPLATE GENERATION BASED ON ATTACHMENTS

RELATED APPLICATIONS

Benefit is claimed under 35 U.S.C. 119(a)-(d) to Foreign Application Serial No. 202241040755 filed in India entitled "SMART EMAIL TEMPLATE GENERATION BASED ON ATTACHMENTS", on Jul. 16, 2022, by VMware, Inc., which is herein incorporated in its entirety by reference for all purposes.

BACKGROUND

Electronic mail ("Email") has become a necessary part of the modern workplace. Although emails often only include plain text in the body of an email to convey a message, emails can also include file attachments. Short, static descriptions of the file attachments are often included within the body of the email. People can send many of emails with attachments per day, each requiring the user to enter a description for each of the file attachments.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
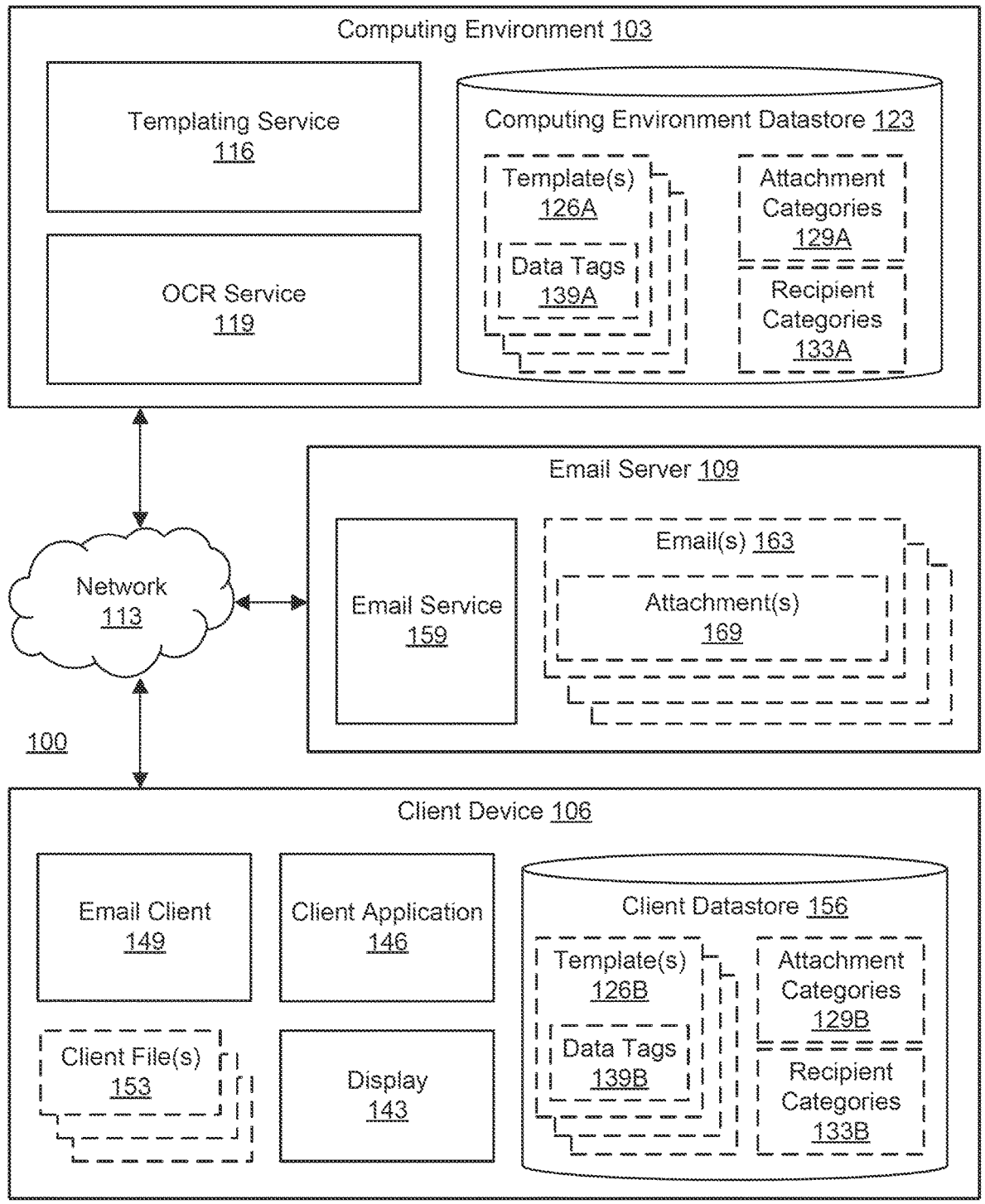
FIG. 1 is a drawing of a network environment according to various embodiments of the present disclosure.

Disclosed are various approaches for generating reusable email templates and identifying a reusable email template based on file attachments, email recipients, and/or time of day. Electronic mail ("Email") has become a necessary part of the modern workplace. Although emails can be bespoke messages conveying a unique message, people often send standardized, rote email messages as a part of their daily work duties. For instance, worker/contractor can send a list of hours the worker/contractor worked to a manager or HR representative weekly to ensure the worker/contractor is paid. In another example, a manager can send out a monthly project overview to each member of the team so each member can stay informed.

Often, these standardized, rote emails require one or more email attachments to be shared. For instance, in the example where the worker/contractor sends a list of hours that the worker/contractor worked to a manager or HR representative, the manager of HR representative can require that the hours be entered into a spreadsheet (e.g., Microsoft Excel, Apple Numbers, etc.) and attached to the email. In another example, a worker (e.g., construction worker, delivery person, etc.) can be required to upload photographs as proof of work completed. In yet another example, a software developer can send one or more log files to coworkers that are a result of daily stress testing for the system. In each of these examples, the body content of the email barely changes, but the content of each attachment often varies.

Additionally, people often send the same style of email with similar attachments repeatedly to the same email recipients. For instance, in the example where the worker/contractor sends a list of hours, the worker consistently sends that same or similar email to the same recipient, the HR representative. In another example, a software developer often sends log files to other software developers, but they would likely not send logs to managers, HR representatives, or anyone outside of a specific product's team. In each of these examples, the type of the attachment and other attachment information can often assist in predicting the recipients of a specified email.

Further, people can send emails with similar or the same attachments to different recipients. For instance, an employed contactor can send a billing estimate for work to be completed to both a customer and to the billing department. Although the attachments can be similar or the same, the content of the email message can vary. In such an example, the contractor might want to have a different tone to the content of each email. When the contractor sends an email to the customer, the contractor might want the language to be more reassuring and helpful. However, when the contract sends an email to a recipient within the company, the contractor might want to be more efficient with their language. In this example, the recipient of the email often influences the content of the email.

Other factors can also influence the expected content of an email. For instance, date and time can often influence the expected content of an email. For instance, a software developer can send log files to their managers at the end of each workday during the work week. Additionally, the software developer can send log files to their co-workers earlier in the day during the workweek. If the software developer has attached log files to an email on the end of a workday and at the end of the work week, the software developer might be more likely to send that email to a manager instead of a coworker. Because the email is likely intended for a manager and not a co-worker, the content of the email might likely need to be more professional in tone. The aforementioned example demonstrates that date and time can influence decisions related to both the recipient of an email and content of the email.

As such, various embodiments of the present disclosure are directed to generating reusable email templates based on file attachments, email recipients, and/or other additional factors, like date and time. Additionally various embodiments of the present disclosure are directed to identifying a reusable email template for use in an email client based on file attachments, email recipients, and/or other factors, such as date and time.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a network environment 100 according to various embodiments. The network environment 100 can include a computing environment 103, a client device 106, and email server 109, which can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a templating service 116, an Optical Character Recognition ("OCR") service 119 and other applications, services, processes, systems, engines, or functionality not discussed in detail herein.

The templating service 116 can be executed to generate templates based on contents of emails 163. In one example, as further described in FIG. 3, the templating service 116 can be executed to obtain emails 163 having attachments 169. Next, the templating service 116 can select an email 163. Next, the templating service 116 can analyze attachments 169 to select one or more attachments categories 129. Next, the templating service 116 can analyze the recipients to identify recipient categories 133. The previously mentioned steps can be applied for each email so that each of the obtained emails have attachment categories 129 and recipient categories 133. Next, the templating service 116 can identify emails 163 that have common attachment categories 129, common recipient categories 133, and/or other factors, such as date and time. Next, the templating service 116 can generate a template 126 for identified emails 163, and store said template 126 in the computing environment datastore 123. Further information about the execution of the templating service 116 is further described in description of FIG. 3.

Additionally, the templating service 116 can be executed to transfer templates 126A from the computing environment datastore 123 to a client datastore 156 to be stored as templates 126B. The templating service 116 can transfer some, or all, of the templates 126A from the computing environment datastore 123. For example, the templating service 116 can identify templates 126A that correspond with a user of the client device 106, select a subset of templates 126 corresponding with a user of the client device 106, and transfer said subset of templates 126 to the client device 106, wherein the client datastore 156 can store the subset of templates 126 as templates 126B on the client device 106.

The OCR service 119 can be executed to identify and extract content from files that can be otherwise difficult to interpret, such as image files (e.g., JPG, PNG, BMP, TIFF, GIF, EPS, RAW, etc.), Portable Document Format ("PDF") files, and similarly difficult to interpret file types. For example, the templating service 116, while analyzing the attachments 169 for an email 163, can send the file to the OCR service 119 to attempt to extract content. For instance, an attachment 169 can be a screenshot image depicting problematic software code. The OCR service 119 can process the image to identify and extract any text displayed in the screenshot image. The OCR service 119 can deliver any such extracted text to the templating service 116 for use in categorizing the attachment 169.

Also, various data is stored in a computing environment data store 123 that is accessible to the computing environment 103. The computing environment data store 123 can be representative of a plurality of computing environment data stores 123, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the computing environment data store 123 is associated with the operation of the various applications or functional entities described below. This data can include templates 126A, attachment categories 129A, recipient categories 133A, and potentially other data.

Templates 126A (generically as "templates 126") can represent content of an email that can be used to make drafting emails faster for a user. An example of a template 126 is depicted and further described in the discussion of FIG. 2A. Templates 126 can be generated programmatically by a templating service 116 or manually by a user. Further explanation of generating templates 126 programmatically with a templating service 116 is described in the discussion of FIG. 3. Templates 126 can be associated with a user of a client device 106, one or more recipients (email addresses), one or more attachment categories 129, one or more attachment categories 133, date and time, or other data not discussed. Specifically, when the Templates 126 are stored in either the computing environment datastore 123 or the client datastore 156, the templates 126 can be indexed by and/or associated with at least one of a user identifier corresponding to a user of a client device 106, one or more attachment categories 129, one or more recipient email addresses, one or more recipient categories 133, and/or other factors, such as date and time.

Templates 126 that are associated with other factors, such as date and time, can be associated with broad categories of date and time and specific dates and times. For instance, a template 126 can be associated with an hour of the day (e.g., 9 am, Noon, 5 pm, etc.), a time range (e.g., 9:00 am to Noon, Noon to 3:30 pm, 3:15 pm to closing, etc.), relative categories of time (e.g., starting time, closing time, etc.), a certain day of the week (e.g., Monday, Tuesday, Wednesday, etc.), a range of days (e.g., Monday-Friday, Saturday-Sunday, etc.), a week of the month (e.g., first week, second week, last week, etc.), a month of the year (e.g., January, February, March, etc.), a season of the year (e.g., Winter, Spring, Summer, Fall, holiday season, back-to-school season, etc.), and/or quarter in a fiscal year (e.g., first quarter/Q1, second quarter/Q2, etc.). Additionally, non-date/time factors can also be associated with templates 126, such as email importance level (e.g., high importance, low importance, etc.), email security level (e.g., is email encrypted, etc.), email format (e.g., plain text, rich text, HTML, etc.), tracking information (e.g., delivery receipt requested, read receipt requested, voting buttons included, etc.), email expiration, and various other factors.

The templates 126A can include one or more data tags 139A (generically as data tags 139). Data tags 139 act as placeholders within a template 126 that can be programmatically populated by a client application 146, an email client 149, or a templating service 116. In at least another embodiment, a user of the client device 106 manually populate the data tags 139 on the client device 106. A data tag 139 can include a description of the type of information to be provided.

For example, a data tag 139 can be formatted as "{Attachment-1}" where the brackets "{" and "}" are special characters and the word "Attachment-1" is a data identifier. The brackets "{" and "}" act as special characters in the template to identify the start and end of a data tag 139. These special characters to identify the start and end of a data tag 139 can be one or more characters and can be chosen based on configurations of any such population application, such as the client application 146, the email client 149, the templating service 116, or any application used to populate the template 126. For example, starting special characters can include double-brackets "{{", an escaped-bracket "\{", square-brackets "[[", an escaped-square bracket "\[", or any other indicator that the tag is starting. Additionally, ending special characters can include double-brackets "}}", an escaped-bracket "\}", square-brackets "]]", an escaped-square bracket "\]", or any other indicator that the tag is ending. The data tag 139 can also conform to a templating or markup format, such as Handlebars, HTML Actionable Markup Language ("Haml"), Pug (formerly Jade), Embedded JavaScript Templating ("EJS"), built-in templating formats for various programming languages, or other templating or markup format.

To continue the example where a data tag 139 can be formatted as "{Attachment-1}", the word "Attachment-1" acts as a data identifier that signifies the content of information that should replace the data tag 139 when populating the template 126. In this example, "Attachment-1" can be interpreted by the application populating the template 126 to replace the data tag 139 with the file name of a first client file 153 attached to the unsent email. These identifiers can vary based on the type of data provided to the application populating the template 126, the templating or markup format of the data tag 139, and/or various other factors. For instance, a data tag 139 displayed as "{Attachment-Name}" could also be replaced by the file name of a first client file 153 attached to the unsent email. In another example, both "{{#img-size-H}}" corresponding to a handlebars-formatted first template 126 and "#{imgsizeH}" corresponding to a pug-formatted second template 126 could both output the height of an attached client file 153 image using their respective templating formats.

A data tag 139 can have an identifier that does not correspond to data from an attached client file 153. For instance, a data tag 139 can be formatted as "{user-input}", which would direct an email client 149, client application 146, or templating service 116 to generate a way for user to provide input. In at least one embodiment, a user input data tag 139 can be replaced by blank space. In another embodiment, a user input data tag 139 can be replaced by one or more underscores "_" to indicate the user must fill out information. In another embodiment, a user input data tag 139 can be replaced by one or more form fields, such as one or more text fields, one or more check boxes, one or more radio selectors, one or more buttons, or similar types of form fields. In an embodiment where a user input data tag 139 is replaced by a button form field, the button can initiate programs or run code on the computing device, when provided interaction. For example, the button form field can generate a pop-up to do any number of tasks or data collection.

The attachment categories 129A can represent a plurality of keyword descriptors used to describe a client file 153 or an attachment 169. An attachment category 129 can describe certain portions of the metadata for a client file 153, such as the file type, the size of the document, the permission properties, or other metadata information. An attachment category 129 describing a file type can include the full name of a file type (e.g., "Word Document", "Virtual Machine Configuration", "Log File", etc.), a categorical name (e.g., image, video, document, spreadsheet, etc.), and/or a file extension type (e.g., .docx, .jpg, .vmx, .log, etc.). An attachment category 129 describing the size of the document can include the document's disk usage range (e.g., "1 MB-50 MB", "500 KB-1 MB", etc.), document dimensions (e.g., 8.5 in×11 in, "1200×1900 px", etc.), and/or size descriptions as words (e.g., "Large Image", "Landscape A4 Paper" etc.). An attachment category 129 describing file permission settings can include a visual depiction of the file permissions (e.g., "RWX", "R-X", "755", etc.), a name assigned to a permission group (e.g., "Human Resources", "Group 22", etc.), and/or general level of security (e.g., "Confidential", "Privileged", etc.).

An attachment category 129 can also describe certain portions of the content of a client file 153. For text-based file formats (e.g., text files, Word documents, certain spreadsheets, etc.), an application can read the contents of the client file 153 to obtain keywords, titles, headers, or common words and phrases (e.g., "End of Year Report", "Daily Log", "Receipt" etc.). For non-text-based file formats, a client file 153 can be processed by an OCR service 119 to generate a text-description of the file and similar keywords can be extracted. In one example, a user can upload a client file 153 image depicting a screenshot of the user's computer desktop with a command line prompt open. The client file 153 image can be sent to the OCR service 119 to generate a text-description. The text description can include the words "Command Prompt", which can be used as an attachment category 129. In another example, the user can upload a client file 153 image depicting one or more persons. In at least one embodiment, the OCR service 119 can recognize a face of the one or more persons depicted in the image and attribute a name or identifier for that person. The name or identifier can be used as an attachment category 129. Additional attachment categories 129 not disclosed can also be included.

The recipient categories 133A can represent a plurality of keyword descriptors used to describe the audience for which the email is directed. For instance, recipient categories 133 can include recipient position titles (e.g., "Manager", "Vice-President", "CEO", "Software Developer", "HR Representative", etc.), recipient "org chart" grouping (e.g., "C-Suite/Management", "Operations", "Go-To Market", "Technology" etc.), recipient seniority (e.g., "Intern", "Senior Developer", etc.), and/or various other categories. Additionally, a recipient category 133 can indicate whether a recipient works at the user's business or for an outside business (e.g., "Co-worker", "Outside Contractor", "Intel Partnership", etc.). Additionally, a recipient category 133 can include descriptors for a project team (e.g., "2022 Compliance Review Team", "Team for I189" etc.). Additional recipient categories 133 not disclosed can also be included. Recipient categories 133 can be useful for generating templates because the writer of an email 163 often uses different language based on their recipient. For instance, a writer can use more collegial language with direct co-workers, but the writer likely uses a more professional tone when writing an email to a manager, owner, or executive of a business.

The client device 106 is representative of a plurality of client devices that can be coupled to the network 113. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 143, such as liquid crystal displays (LCDs), gas plasma-based flat panel displays, organic light emitting diode (OLED) displays, electrophoretic ink ("E-ink") displays, projectors, or other types of display devices. In some instances, the display 143 can be a component of the client device 106 or can be connected to the client device 106 through a wired or wireless connection.

The client device 106 can be configured to execute various applications such as a client application 146, an email client 149, or other applications. The client application 146 can be executed in a client device 106 to access network content served up by the computing environment 103 or other servers, thereby rendering a user interface on the display 143. To this end, the client application 146 can include a browser, a dedicated application, or other executable, and the user interface can include a network page, an application screen, or other user mechanism for obtaining user input. The client device 106 can be configured to execute applications beyond the client application 146 and the email client 149, such as social networking applications, word processors, spreadsheets, or other applications.

The client application 146 can be executed to process a template 126 based on provided client files 153 to populate the body of an unsent email on a client device 106. In a first example, as further described in FIG. 4, the client application can obtain templates 126, analyze attached client files 153 to determine one or more attachment categories 129, analyze recipients to determine one or more recipient categories 133, select a template based on the selected attachment categories 129, recipient categories 133, and/or other factors, such as date and time, and populate the body of the unsent email with the selected template. In another example, as further described in FIG. 5, the client application can obtain templates 126, analyze attached client files 153 to determine one or more attachment categories 129, select a template based on the selected attachment categories 129 and/or other factors, such as date and time, populate the body of the unsent email with the selected template, and suggest an expected recipient based on recipient categories 133 associated with the selected template 126.

Additionally, the client application 149 can be configured to access sent and received emails 163 from an email server 109 through an email service 159. The client application 149 can also be configured to send one or more client files 153 to an OCR service 119. The client application 149 can also be configured to obtain one or more templates 126A, one or more attachment categories 129A, and one or more recipient categories 133A from the computing environment datastore 123 and store them as templates 126B, attachment categories 129B, and recipient categories 133B of the client datastore 156.

The email client 149 can be executed to send, receive, display, edit, and otherwise interact with emails, contacts, and/or calendars. The email client 149 can be a standalone desktop or mobile application (e.g., Workspace ONE Boxer, Microsoft Outlook, etc.) or a web email application (e.g., Gmail, Yahoo! Mail, etc.) configured to run in a web browser. The email client 149 can be configured to allow a user to draft a new email (an "unsent email"). The email client 149 can also be configured to access client files 153 to attach to an unsent email. The client files 153 can be stored on one or more hard drives on the client device 106. Client files 153 can include file contents, file name, a file type, file permissions, and various other properties. The client files 153 can include any file type. For instance, the client files can include images, videos, text-based documents, spreadsheets, logs, and various other file types. The email client 149 can access sent and received emails 163 from an email server 109 through an email service 159.

Also, various data is stored in a client data store 156 that is accessible to the client device 106. The client data store 156 can be representative of a plurality of client data stores 156, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the client data store 156 is associated with the operation of the various applications or functional entities described below. This data can include templates 126B, attachment categories 129B, recipient categories 133B, and potentially other data.

The templates 126B stored on the client datastore 156 can be a copy of the templates 126A of the computing environment datastore 123. In at least another embodiment, the templates 126B of the client datastore 156 can be a copy of a subset of templates 126A of the computing environment datastore 123. It should be understood that any features of the templates 126A can also be features of templates 126B. Any data tags 139B associated with a template 126B on the client datastore 156 can be a copy of the data tags 139A associated with its corresponding template 126A on the computing environment datastore 123. It should be understood that any features of the data tags 139B can also be features of the data tags 139A.

The attachment categories 129B stored on the client datastore 156 can be a copy of the attachment categories 129A of the computing environment datastore 123, as previously described. In at least another embodiment, the attachment categories 129B stored on the client datastore 156 can be a copy of a subset of attachment categories 129A of the computing environment datastore 123. It should be understood that any features of the attachment categories 129A can also be features of attachment categories 129B.

The recipient categories 133B stored on the client datastore 156 can be the recipient categories 133A of the computing environment datastore 123, as previously described. In at least another embodiment, the recipient categories 133B stored on the client datastore 156 can represent a subset of recipient categories 133A of the computing environment datastore 123. It should be understood that any features of the recipient categories 133A can also be features of recipient categories 133B.

The email server 109 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the email server 109 can employ a plurality of computing devices that can be arranged in one or more server banks or computer banks or other arrangements. Such computing devices can be located in a single installation or can be distributed among many different geographical locations. For example, the email server 109 can include a plurality of computing devices that together can include a hosted computing resource, a grid computing resource, or any other distributed computing arrangement. In some cases, the email server 109 can correspond to an elastic computing resource where the allotted capacity of processing, network, storage, or other computing-related resources can vary over time.

Various applications or other functionality can be executed in the email server 109. The components executed on the email server 109 include an email service 159 and other applications, services, processes, systems, engines, or functionality not discussed in detail herein.

The email service 159 can be executed to send, receive, store, and otherwise manage emails for one or more domains. The email service 159 can communicate with one or more applications running on a client device 106 or one or more applications running on a computing environment 103. The email service 159 can use standard email protocols, such as SMTP, IMAP, and POP3 protocols. The email service 159 can also be configured to manage a contact list that is associated with each email address. The contact list can include contact names, emails, phone numbers, and other information about the specified contact. Examples of an email service 159 include Microsoft Exchange Server, IMail server, IceWarp Mail Server, Mail Enable, hMail-Server, Exim, Dovecot, Courier, Google workspace, or similar email services.

The emails 163 can represent one or more electronic messages processed by the email service 159. An email 163 can include header information, an email body, and zero or more attachments 169. An attachment 169 of the email 163 can represent a client file shared between one or more users via an email message. An attachment 169 can be sent directly with the email 163 or be uploaded previously to be stored on the email server 109 and then subsequently referenced by a link in at least of the header or the body of the email 163.

Figure 2A:
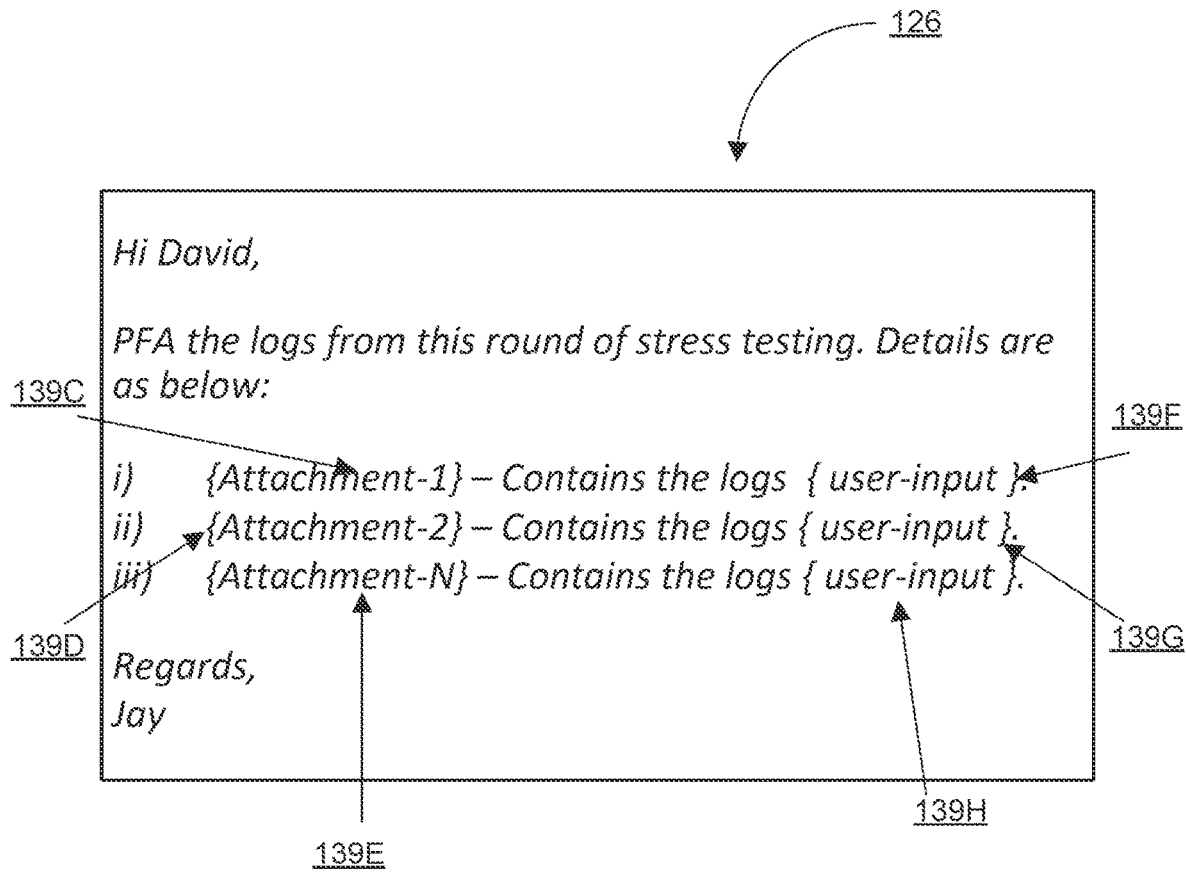
FIG. 2A is a pictorial diagram of an example template generated by the computing environment in the network environment of FIG. 1 according to various embodiments of the present disclosure.

Referring next to FIG. 2A, shown is an example template 126, as previously described. The template 126 depicts generated body content of an email including data tags 139C-H. The data tag 139C corresponds to a first attachment to an email. The data tag 139D corresponds to a second attachment to an email. The data tag 139E corresponds to an Nth attachment to an email. The data tag 139F corresponds to a first section requiring user input. The data tag 139G corresponds to a second section requiring user input. The data tag 139H corresponds to an Nth section requiring user input.

Figure 2B:
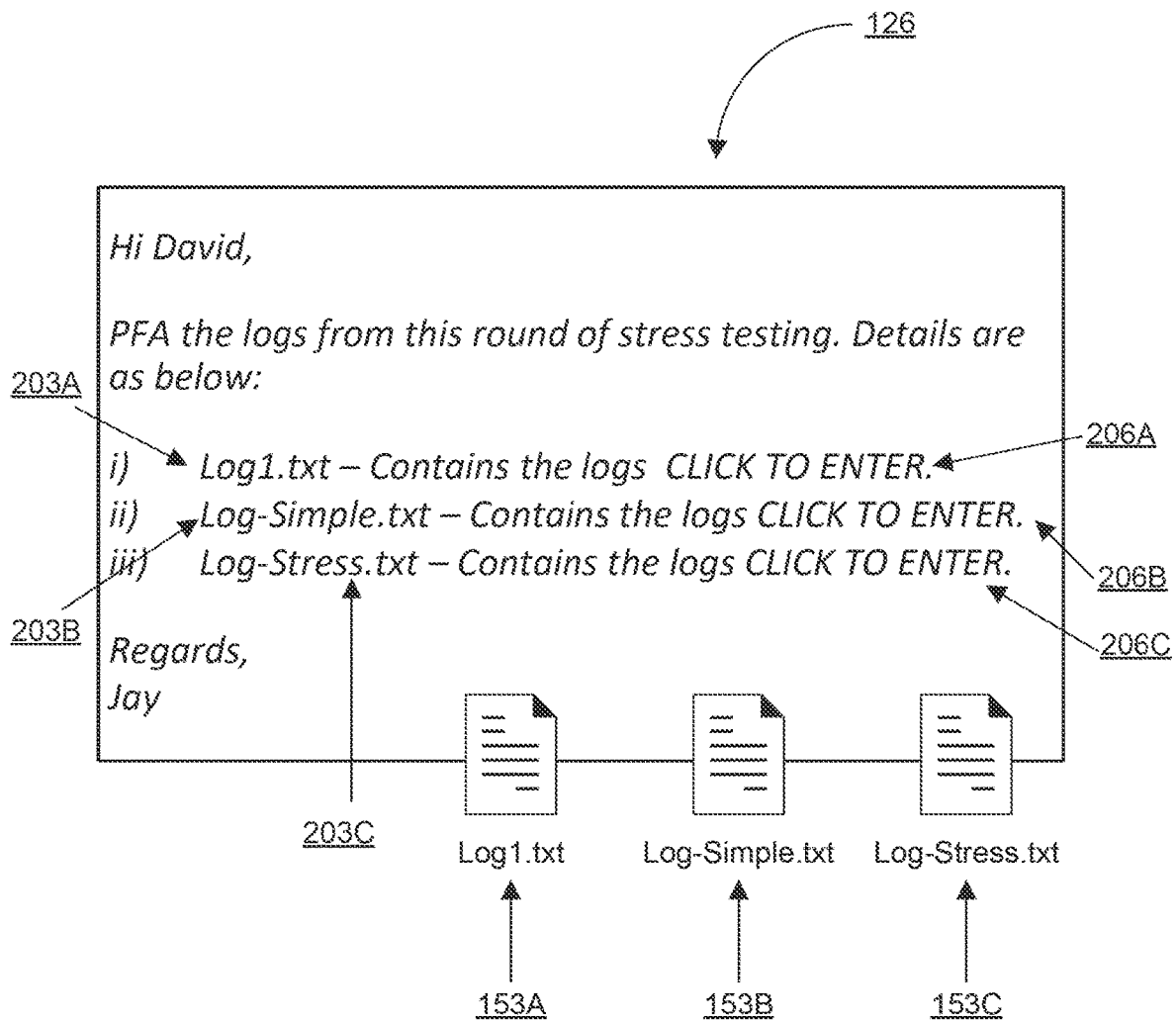
FIG. 2B is a pictorial diagram of an example template generated by the computing environment and populated with values entered on the client device in the network environment of FIG. 1 according to various embodiments of the present disclosure.

Turning now to FIG. 2B, shown is the example template 126 of FIG. 2A as populated with data from client files 153A-C. The client files 153A-C represent text files that have been attached to an unsent email on the email client 149. The client file 153A has a filename of "Log1.txt." The client file 153B has a filename of "Log-Simple.txt." The client file 153C has a filename of "Log-Stress.txt."

When the data from the client files 153A-C populate the template 126, the data tags 139C-E, depicted in FIG. 2A, are replaced by the filenames 203A-C of the attached client files 153A-C, as shown in FIG. 2B. The filename 203A (depicted as "Log1.txt") of file 153A replaces data tag 139C in the template 126. The filename 203B (depicted as "Log-Simple.txt") of file 153B replaces data tag 139D in the template 126. The filename 203C (depicted as "Log-Stress.txt") of file 153C replaces data tag 139E.

When data populates the template 126 and a data tag 139 indicates user input is required, the template 126 can replace such data tag 139 with an input field, button, blank space, or any type of data indicating to a user that user input is required to complete this document. In FIG. 2B, the data tags 139F-H have been replaced by buttons 206A-C that indicate the user should "click to enter" data. When a user clicks an of the buttons 206A-C, the user can receive a popup allowing the user to enter data. In at least another embodiment, when the user clicks an of the buttons 206A-C, the button is replaced with empty space.

Figure 3:
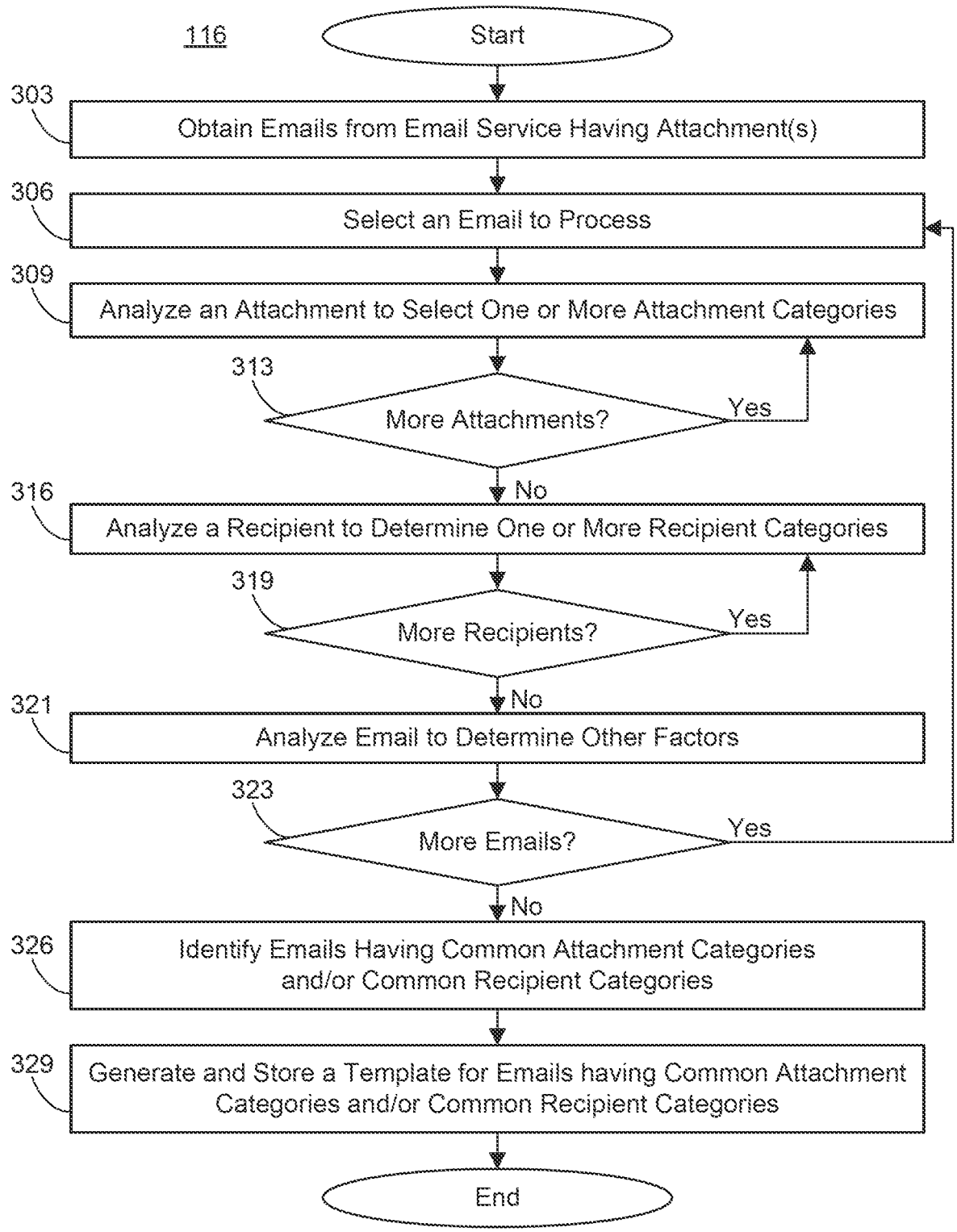
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the templating service 116. The flowchart of FIG. 3 provides merely an example of the many different types of functional arrangements that can be employed to implement the operation of the depicted portion of the templating service 116. As an alternative, the flowchart of FIG. 3 can be viewed as depicting an example of elements of a method implemented within the network environment 100.

Beginning with block 303, the templating service 116 can obtain emails 163 from the email service 159 having one or more attachments 169. The templating service 116 can be configured to access emails 163 from an email service 159. The templating service 116 can send a request to the email service 159 requesting one or more emails that include attachments 169 that a specified user of a client device 106 sent to one or more recipients. The request to obtain emails 163 can include a specified date and/or time range, a specified subject, and/or a specified number limit for emails 163. To ensure the templating service 116 does not become overwhelmed with receiving requested emails, the templating service 116 can be configured to request a limited number of emails over multiple requests. The email service 159 can respond to the request by sending the templating service 116 one or more emails 163 including attachments 169 for the specified user of a client device 106. The templating service 116 can be configured to receive the emails 163 including attachments 169 and store the emails 163 in memory or on the hard drive.

At block 306, the templating service 116 can select an email 163 to process. Blocks 306 to 323 can act as a loop to process each email the templating service 116 received from the email service 159. The email 163 selected is subsequently referenced, with respect to FIG. 3, as the selected email 163.

At block 309, the templating service 116 can analyze an attachment 169 to the selected email 163 and to select one or more attachment categories 129 to associate with the selected email 163. The templating service 116 can analyze the metadata of the attachment 169 to select one or more attachment categories related to the file type, the size of the document, the permission properties, and/or other metadata information. An attachment category 129 describing a file type can include the full name of a file type (e.g., "Word Document", "Virtual Machine Configuration", "Log File", etc.), a categorical name (e.g., image, video, document, spreadsheet, etc.), and/or a file extension type (e.g., .docx, .jpg, .vmx, .log, etc.). An attachment category 129 describing the size of the document can include the document's disk usage range (e.g., "1 MB-50 MB", "500 KB-1 MB", etc.), document dimensions (e.g., 8.5 in×11 in, "1200×1900 px", etc.), and/or size descriptions as words (e.g., "Large Image", "Landscape A4 Paper" etc.). An attachment category 129 describing file permission settings can include a visual depiction of the file permissions (e.g., "RWX", "R-X", "755", etc.), a name assigned to a permission group (e.g., "Human Resources", "Group 22", etc.), and/or general level of security (e.g., "Confidential", "Privileged", etc.).

The templating service 116 can also analyze the content of the attachment 169 to select one or more attachment categories. For text-based file formats (e.g., text files, Word documents, certain spreadsheets, etc.), the templating service 116 can read the contents of the attachment 169 to obtain keywords, titles, headers, or common words and phrases (e.g., "End of Year Report", "Daily Log", "Receipt" etc.). For non-text-based file formats, an attachment 169 can be processed by an OCR service 119 to generate a text-description of the file and similar keywords can be extracted. In one example, an attachment 169 can be an image depicting a screenshot of the user's computer desktop with a command line prompt open. The attachment 169 image can be sent to the OCR service 119 to generate a text-description. The text description can include the words "Command Prompt", which can be used as an attachment category 129. In another example, an attachment 169 can be an image depicting one or more persons. In at least one embodiment, the OCR service 119 can recognize a face of the one or more persons depicted in the image and attribute a name or identifier for that person. Such a name or identifier can be used as an attachment category 129. When the attachment categories 129 have been selected, the attachment categories 129 can be associated with the selected email 163.

At block 313, the templating service 116 can check for additional attachments 169 attached to the email 163. If there are additional attachments 169 that have not yet been analyzed under block 309, the method returns to block 309 and selects one of the additional attachments 169 that have not yet been analyzed. If there are no additional attachments 169 or if every attachment has been analyzed under block 309, the method proceeds to block 316.

At block 316, the templating service 116 can analyze a recipient of the selected email 163 and select one or more recipient categories 133 to associate with the selected email 163. The recipient categories 133A can represent a plurality of keyword descriptors used to describe the audience for which the email is directed. For instance, recipient categories 133 can include recipient position titles (e.g., "Manager", "Vice-President", "CEO", "Software Developer", "HR Representative", etc.), recipient "org chart" grouping (e.g., "C-Suite/Management", "Operations", "Go-To Market", "Technology" etc.), recipient seniority (e.g., "Intern", "Senior Developer", etc.), and/or various other categories. Additionally, a recipient category 133 can indicate whether a recipient works at the user's business or for an outside business (e.g., "Co-worker", "Outside Contractor", "Intel Partnership", etc.). Additionally, a recipient category 133 can include descriptors for a project team (e.g., "2022 Compliance Review Team", "Team for I189" etc.).

In at least one embodiment, the templating service 116 can analyze the body of the selected email 163 to select one or more recipient categories 133. For instance, the body of the selected email 163 can contain one or more email signatures of previous emails incorporated into this email that indicate the recipient's user information, such as name, title, or other various information. Additionally, the body of the message can reference the recipient or indirectly. For instance, an email body can include the sentence, "I have looped in my manager, Arvind, to this email thread." In such an example, the templating service 116 can identify that Arvind is a manager of the sender. In another example, an email body can include the following sentences, "Arvind, can you please review these files? I am awaiting your approval." In such an example, the words "review" and "awaiting your approval" indirectly indicate that Arvind is responsible for reviewing the files for the sender. In at least one embodiment, the templating service 116 can communicate with a service that manages user information about recipients, such as the email service 159 or the computing environment data store 123. For instance, the templating service 116 can connect to a service or a data store on the computing environment 103 that manages data about the employees for an organization, including their position, their teams, their place in the organizational hierarchy, and much more. When the recipient categories 133 have been selected, the recipient categories 133 can be associated with the selected email 163.

At block 319, the templating service 116 can check for additional recipients included on the selected email 163. If there are additional recipients that have not yet been analyzed under block 316, the method returns to block 316 and selects one of the additional recipients that have not yet been analyzed. If there are no additional recipients or if every recipient has been analyzed under block 316 then the processing of the selected email 163 is complete and the method proceeds to block 321.

At block 321, the templating service 116 can analyze the selected email 163 to determine other factors, such as date and time, related to the email. The templating service can analyze the email 163 to determine broad categories of date and times as well as specific dates and times. For instance, the delivery date and time of an email 163 can be analyzed to determine an hour of the day (e.g., 9 am, Noon, 5 pm, etc.), a time range (e.g., 9:00 am to Noon, Noon to 3:30 pm, 3:15 pm to closing, etc.), relative categories of time (e.g., a starting time, closing time, etc.), a certain day of the week (e.g., Monday, Tuesday, Wednesday, etc.), a range of days (e.g., Monday-Friday, Saturday-Sunday, etc.), a week of the month (e.g., first week, second week, last week, etc.), a month of the year (e.g., January, February, March, etc.), a season of the year (e.g., Winter, Spring, Summer, Fall, holiday season, back-to-school season, etc.), and/or quarter in a fiscal year (e.g., first quarter/Q1, second quarter/Q2, etc.). Additionally, non-date/time factors can also be analyzed by the templating service 116, such as email importance level (e.g., high importance, low importance, etc.), email security level (e.g., is email encrypted, etc.), email format (e.g., plain text, rich text, HTML, etc.), tracking information (e.g., delivery receipt requested, read receipt requested, voting buttons included, etc.), email expiration, and various other factors.

At block 323, the templating service 116 can check for additional emails 163 available to process. If there are additional emails 163 that have not yet been processed under blocks 306-323, the method returns to block 306 and selects one of the additional emails 163 that have not yet been processed. If there are no additional emails 163 or if every email 163 has been processed under blocks 306-323, the method proceeds to block 326.

At block 326, the templating service 116 can identify two or more emails 163 associated with the same or similar attachment categories 129, recipient categories, and/or other factors, such as date and time 133. After processing each of the emails 163, each email 163 can be associated with one or more attachment categories 129, one or more recipient categories 133, and/or other factors, such as date and time. The templating service 116 can select a first email 163 and a second email 163. The templating service 116 then compare the attachment categories 129, the recipient categories 133, and/or other factors, such as date and time, of the first email 163 to the attachment categories 129 and/or the recipient categories 133 of the second email 163. If the first email 163 and the second email 163 do not share many attachment categories 129, recipient categories 133, and/or other factors, such as date and time, the templating service 116 can select a new second email 163 and compare the attachment categories 129, the recipient categories 133, and/or other factors, such as date and time, as previously disclosed. If the first email 163 and the second email 163 meet a threshold of similarity, the method can move to block 329. Although the description of block 326 explains comparisons between a first email 163 and a second email 163, it should be understood that a plurality of emails 163 could be compared in a similar manner.

At block 329, the templating service 116 can generate and store a template 126 related to emails 163 having shared attachment categories 129, shared recipient categories 133, and/or other shared factors, such as date and time. The templating service 116 can generate a template 126 based on the two or more emails 163 that meet a threshold of similarity as described in block 326. The templating service 116 can compare the bodies of the two or more similar emails 163 to determine where any differences, if any, exist. If a difference exists between the two or more emails 163, the differences can be analyzed to see if the difference can be found in either the attachments 169, the recipient information, and/or the other factors, such as date and time. For instance, a difference between two similar emails can include a first email 163 referencing a first file name in the body of a first email 163 and a second email 163 referencing a second file name in the body of the second email 163. Because the templating service 116 can recognize that a difference between the first email 163 and second email 163 is a file name, the templating service 116 can insert a data tag 139 to identify that a file name can replace the data tag 139. This recognition of differences between the emails 163 and replacing said differences with data tags 139 is referred to as templating. Once the templating service 163 has completed the templating, the templating service 116 can use the result of the templating and store it as a template 126A in the computing environment datastore 123. The template 126A can then be associated with the one or more shared attachment categories 129, one or more shared recipient categories 133A, and/or one or more other factors, such as date and time. In at least one embodiment, the templating service 116 can store the other factors, such as the date and time factors, as a part of the template 126A or as a part of the metadata associated with the template 126A.

Figure 4:
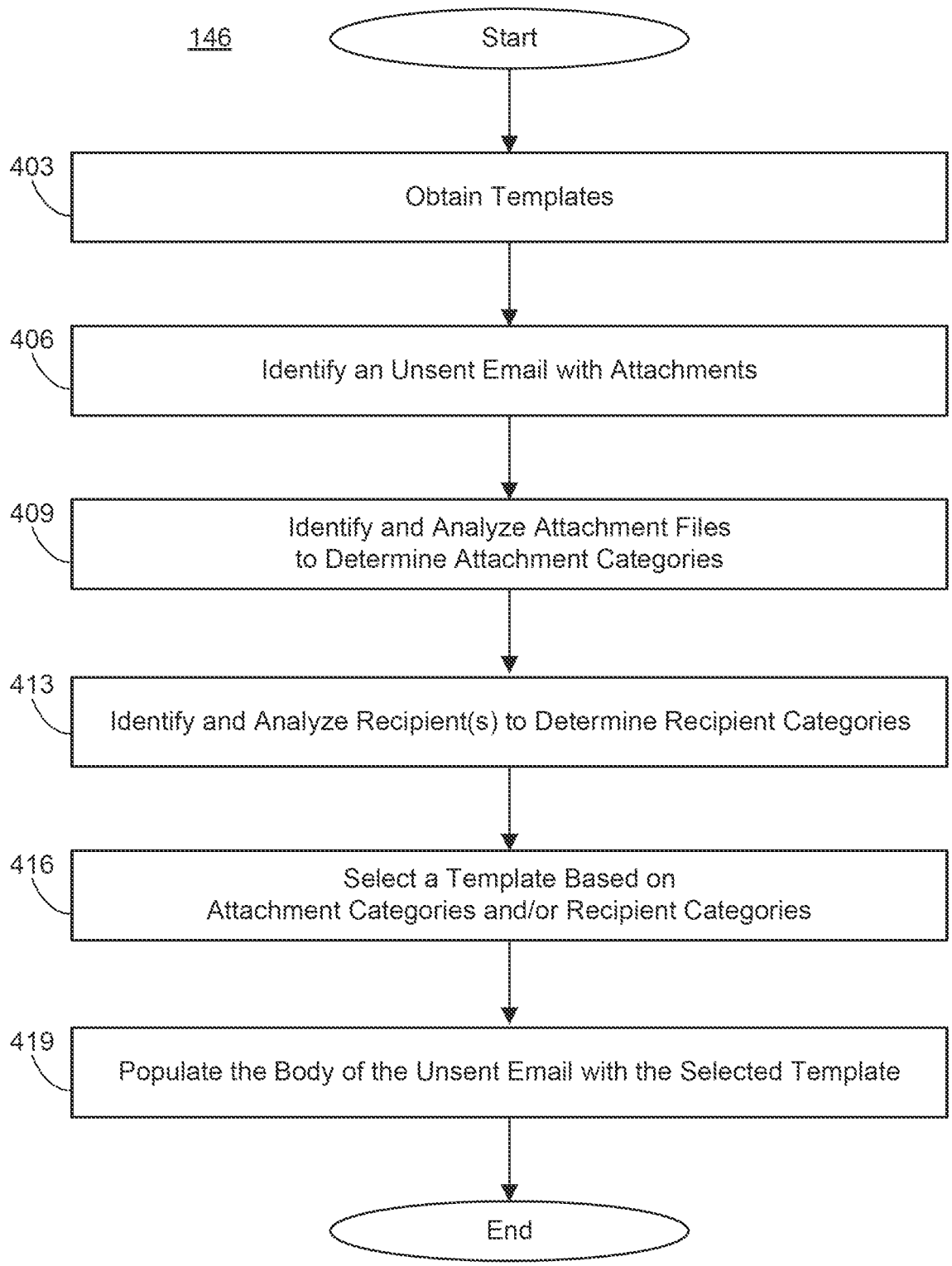
FIG. 4 is a flowchart illustrating one example of functionality implemented as portions of an application executed in a client device in the network environment of FIG. 1 according to various embodiments of the present disclosure.

Referring next to FIG. 4, shown is a flowchart that provides one example of the operation of a portion of the client application 146. The flowchart of FIG. 4 provides merely an example of the many different types of functional arrangements that can be employed to implement the operation of the depicted portion of the client application 146. As an alternative, the flowchart of FIG. 4 can be viewed as depicting an example of elements of a method implemented within the network environment 100.

Beginning with block 403, the client application 146 can obtain templates 126A and store the templates 126A as templates 126B on the client datastore 156. To ensure that the client device has up-to-date templates 126B in the client datastore 156, the client application 146 can be configured to request one or more templates 126A from the computing environment 103. When the client application 146 receives a copy of the templates 126A, the client application 146 can store the copy of the templates 126A as templates 126B in the client Datastore 156. If the client application 146 cannot communicate with the computing environment for any reason, the client application 146 can move forward to block 406 with the existing templates 126B stored in the client datastore 156.

At block 406, the client application 146 can identify an unsent email that includes one or more client file 153 attachments 169. Because the email client 149 can be used to draft new emails 163 that have not been sent to the email service 159, any new email 163 can be considered an unsent email 163. The email client 149 can be configured to permit a user to attach one or more client files 153 to the unsent email 163, making those client files 153 become attachments 169. The client application 146 can be configured to identify when the email client 149 has created an unsent email 163 that has included an attachment.

At block 409, the client application 146 can identify and analyze attachments 169 in the unsent email 163 to determine one or more attachment categories 129. The client application 146 can analyze an attachment 169 to the unsent email 163 and to select one or more attachment categories 129 to associate with the unsent email 163. The client application 146 can analyze the metadata of the attachment 169 to select one or more attachment categories related to the file type, the size of the document, the permission properties, and/or other metadata information. An attachment category 129 describing a file type can include the full name of a file type (e.g., "Word Document", "Virtual Machine Configuration", "Log File", etc.), a categorical name (e.g., image, video, document, spreadsheet, etc.), and/or a file extension type (e.g., .docx, .jpg, .vmx, .log, etc.). An attachment category 129 describing the size of the document can include the document's disk usage range (e.g., "1 MB-50 MB", "500 KB-1 MB", etc.), document dimensions (e.g., 8.5 in×11 in, "1200×1900 px", etc.), and/or size descriptions as words (e.g., "Large Image", "Landscape A4 Paper" etc.). An attachment category 129 describing file permission settings can include a visual depiction of the file permissions (e.g., "RWX", "R-X", "755", etc.), a name assigned to a permission group (e.g., "Human Resources", "Group 22", etc.), and/or general level of security (e.g., "Confidential", "Privileged", etc.).

The client application 146 can also analyze the content of the attachment 169 to select one or more attachment categories 129. For text-based file formats (e.g., text files, Word documents, certain spreadsheets, etc.), the templating service 116 can read the contents of the attachment 169 to obtain keywords, titles, headers, or common words and phrases (e.g., "End of Year Report", "Daily Log", "Receipt" etc.). For non-text-based file formats, an attachment 169 can be processed by an OCR service 119 to generate a text-description of the file and similar keywords can be extracted. In one example, an attachment 169 can be an image depicting a screenshot of the user's computer desktop with a command line prompt open. The attachment 169 image can be sent to the OCR service 119 to generate a text-description. The text description can include the words "Command Prompt", which can be used as an attachment category 129. In another example, an attachment 169 can be an image depicting one or more persons. In at least one embodiment, the OCR service 119 can recognize a face of the one or more persons depicted in the image and attribute a name or identifier for that person. Such a name or identifier can be used as an attachment category 129.

At block 413, the client application 146 can analyze a recipient of the unsent email 163 and select one or more recipient categories 133 to associate with the unsent email 163. If the unsent email 163 does not have any recipients selected, the method can continue to block 416. The recipient categories 133A can represent a plurality of keyword descriptors used to describe the audience for which the email is directed. For instance, recipient categories 133 can include recipient position titles (e.g., "Manager", "Vice-President", "CEO", "Software Developer", "HR Representative", etc.), recipient "org chart" grouping (e.g., "C-Suite/Management", "Operations", "Go-To Market", "Technology" etc.), recipient seniority (e.g., "Intern", "Senior Developer", etc.), and/or various other categories. Additionally, a recipient category 133 can indicate whether a recipient works at the user's business or for an outside business (e.g., "Co-worker", "Outside Contractor", "Intel Partnership", etc.). Additionally, a recipient category 133 can include descriptors for a project team (e.g., "2022 Compliance Review Team", "Team for I189" etc.).

In at least one embodiment, the client application 146 can analyze the body of the unsent email 163 to select one or more recipient categories 133. For instance, the body of the unsent email 163 can contain one or more email signatures of previous emails incorporated into this email that indicate the recipient's user information, such as name, title, or other various information. Additionally, the body of the message can reference the recipient or indirectly. For instance, an email body can include the sentence, "I have looped in my manager, Arvind, to this email thread." In such an example, the client application 146 can identify that Arvind is a manager of the sender. In another example, an email body can include the following sentences, "Arvind, can you please review these files? I am awaiting your approval." In such an example, the words "review" and "awaiting your approval" indirectly indicate that Arvind is responsible for reviewing the files for the sender.

In at least one embodiment, the client application 146 can communicate with a service that manages user information about recipients, such as the email service 159 or the computing environment data store 123. For instance, the client application 146 can connect to a service or a data store on the computing environment 103 that manages data about the employees for an organization, including their position, their teams, their place in the organizational hierarchy, and much more. When the recipient categories 133 have been selected, the recipient categories 133 can be associated with the unsent email 163.

At block 416, the client application 146 can select a template 126 from the client datastore 156. The client application 146 can identify and select a template 126 associated with the same or similar attachment categories 129 and/or recipient categories 133 previously selected in blocks 409 and 413, as well as other factors, such as date and time. For instance, the client application 146 can identify the current date and time on the computing device, determine one or more categories regarding the current date and time, such as an hour of the day (e.g., 9 am, Noon, 5 pm, etc.), a time range (e.g., 9:00 am to Noon, Noon to 3:30 pm, 3:15 pm to closing, etc.), relative categories of time (e.g., starting time, closing time, etc.), a certain day of the week (e.g., Monday, Tuesday, Wednesday, etc.), a range of days (e.g., Monday-Friday, Saturday-Sunday, etc.), a week of the month (e.g., first week, second week, last week, etc.), a month of the year (e.g., January, February, March, etc.), a season of the year (e.g., Winter, Spring, Summer, Fall, holiday season, back-to-school season, etc.), and/or quarter in a fiscal year (e.g., first quarter/Q1, second quarter/Q2, etc.). Additionally, the client application 146 can analyze the email 163 or request configuration information from the email client 149 related to non-date/time factors, such as email importance level (e.g., high importance, low importance, etc.), email security level (e.g., is email encrypted, etc.), email format (e.g., plain text, rich text, HTML, etc.), tracking information (e.g., delivery receipt requested, read receipt requested, voting buttons included, etc.), email expiration, and various other factors.

The client application 146 can then compare the attachment categories 129, the recipient categories 133, and/or other factors, such as date and time, of the unsent email 163 to the attachment categories 129, the recipient categories 133, and/or other factors, such as date and time, for each of the templates 126B. In at least one embodiment, the client application 146 can choose a selected template 126 from the templates 126B that has the most shared attachment categories 129, recipient categories 133, and/or other factors, such as date and time.

At block 419, the client application 146 can populate the body of the unsent email 163 with the selected template 126. The client application 146 can first replace any data tags 136 with specific attachment 169 and/or recipient information, as specified in the template 126 and as previously discussed in the discussion of data tags 136 in FIG. 1. Once the data tags 136 have been replaced, the client application 146 can direct the email client 149 to populate the body of the unsent email 163 with the selected and filled template 126. If the body of the unsent email 163 already contained content, the email client 149 could prompt the user to choose to replace the body of the unsent email 163, add the template 126 to the existing body content, or do nothing. Once the template 126 has been added to the body of the unsent email 163, the method of FIG. 4 ends.

Figure 5:
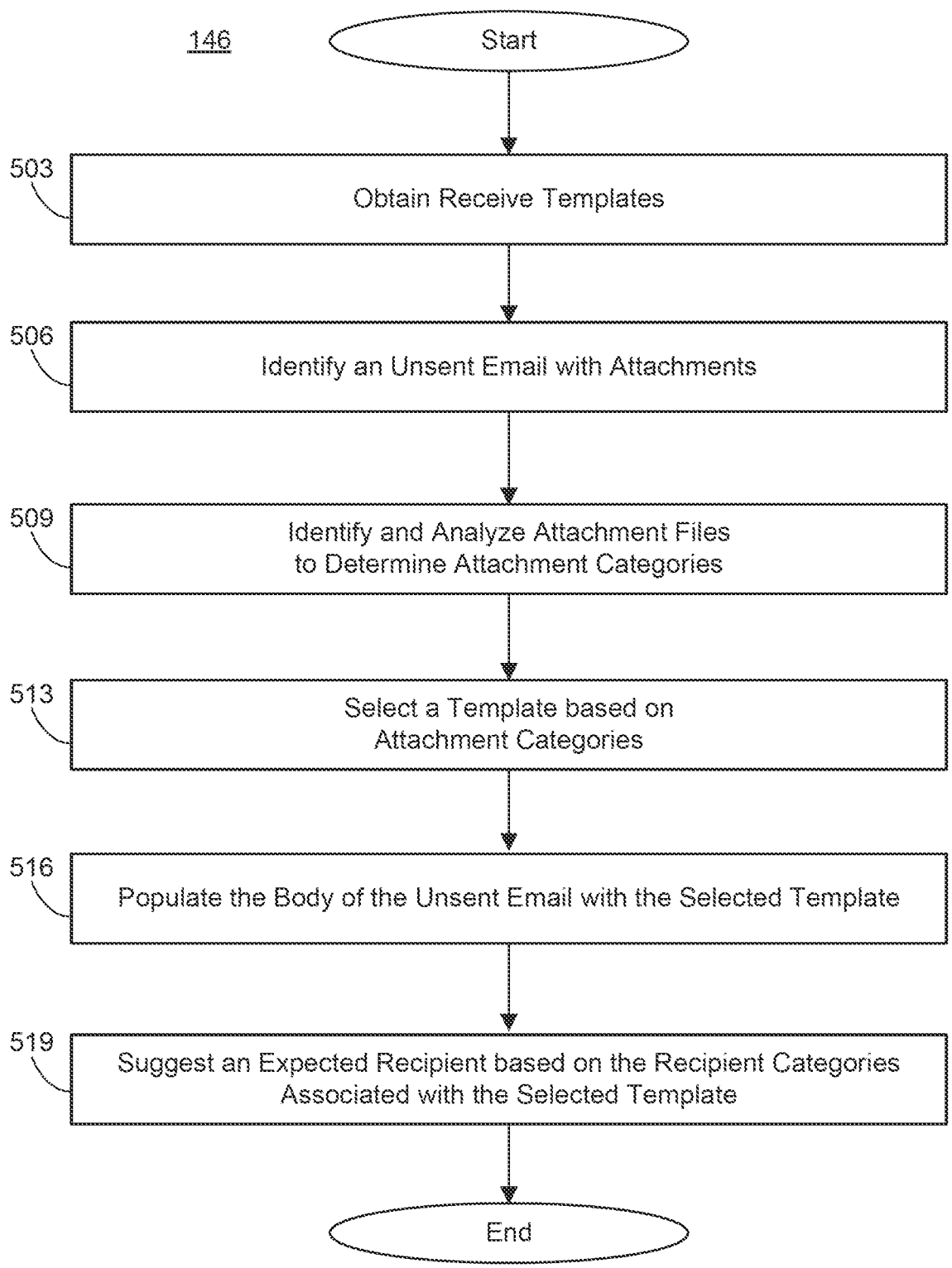
FIG. 5 is a flowchart illustrating one example of functionality implemented as portions of an application executed in a client device in the network environment of FIG. 1 according to various embodiments of the present disclosure.

Referring next to FIG. 5, shown is a flowchart that provides one example of the operation of a portion of the client application 146. The flowchart of FIG. 5 provides merely an example of the many different types of functional arrangements that can be employed to implement the operation of the depicted portion of the client application 146. As an alternative, the flowchart of FIG. 5 can be viewed as depicting an example of elements of a method implemented within the network environment 100.

Beginning with block 503, the client application 146 can obtain templates 126A and store the templates 126A as templates 126B on the client datastore 156. To ensure that the client device has up-to-date templates 126B in the client datastore 156, the client application 146 can be configured to request one or more templates 126A from the computing environment 103. When the client application 146 receives a copy of the templates 126A, the client application 146 can store the copy of the templates 126A as templates 126B in the client Datastore 156. If the client application 146 cannot communicate with the computing environment for any reason, the client application 146 can move forward to block 506 with the existing templates 126B stored in the client datastore 156.

At block 506, the client application 146 can identify an unsent email that includes one or more client file 153 attachments 169. Because the email client 149 can be used to draft new emails 163 that have not been sent to the email service 159, any new email 163 can be considered an unsent email 163. The email client 149 can be configured to permit a user to attach one or more client files 153 to the unsent email 163, making those client files 153 become attachments 169. The client application 146 can be configured to identify when the email client 149 has created an unsent email 163 that has included an attachment.

At block 509, the client application 146 can identify and analyze attachments 169 in the unsent email 163 to determine one or more attachment categories 129. The client application 146 can analyze an attachment 169 to the unsent email 163 and to select one or more attachment categories 129 to associate with the unsent email 163. The client application 146 can analyze the metadata of the attachment 169 to select one or more attachment categories related to the file type, the size of the document, the permission properties, and/or other metadata information. An attachment category 129 describing a file type can include the full name of a file type (e.g., "Word Document", "Virtual Machine Configuration", "Log File", etc.), a categorical name (e.g., image, video, document, spreadsheet, etc.), and/or a file extension type (e.g., .docx, .jpg, .vmx, .log, etc.). An attachment category 129 describing the size of the document can include the document's disk usage range (e.g., "1 MB-50 MB", "500 KB-1 MB", etc.), document dimensions (e.g., 8.5 in×11 in, "1200×1900 px", etc.), and/or size descriptions as words (e.g., "Large Image", "Landscape A4 Paper" etc.). An attachment category 129 describing file permission settings can include a visual depiction of the file permissions (e.g., "RWX", "R-X", "755", etc.), a name assigned to a permission group (e.g., "Human Resources", "Group 22", etc.), and/or general level of security (e.g., "Confidential", "Privileged", etc.).

The client application 146 can also analyze the content of the attachment 169 to select one or more attachment categories 129. For text-based file formats (e.g., text files, Word documents, certain spreadsheets, etc.), the templating service 116 can read the contents of the attachment 169 to obtain keywords, titles, headers, or common words and phrases (e.g., "End of Year Report", "Daily Log", "Receipt" etc.). For non-text-based file formats, an attachment 169 can be processed by an OCR service 119 to generate a text-description of the file and similar keywords can be extracted. In one example, an attachment 169 can be an image depicting a screenshot of the user's computer desktop with a command line prompt open. The attachment 169 image can be sent to the OCR service 119 to generate a text-description. The text description can include the words "Command Prompt", which can be used as an attachment category 129. In another example, an attachment 169 can be an image depicting one or more persons. In at least one embodiment, the OCR service 119 can recognize a face of the one or more persons depicted in the image and attribute a name or identifier for that person. Such a name or identifier can be used as an attachment category 129.

At block 513, the client application 146 can select a template 126 from the client datastore 156. The client application 146 can identify and select a template 126 associated with the same or similar attachment categories 129 previously selected in block 509, as well as other factors, such as date and time. For instance, the client application 146 can identify the current date and time on the computing device, determine one or more categories regarding the current date and time, such as an hour of the day (e.g., 9 am, Noon, 5 pm, etc.), a time range (e.g., 9:00 am to Noon, Noon to 3:30 pm, 3:15 pm to closing, etc.), relative categories of time (e.g., starting time, closing time, etc.), a certain day of the week (e.g., Monday, Tuesday, Wednesday, etc.), a range of days (e.g., Monday-Friday, Saturday-Sunday, etc.), a week of the month (e.g., first week, second week, last week, etc.), a month of the year (e.g., January, February, March, etc.), a season of the year (e.g., Winter, Spring, Summer, Fall, holiday season, back-to-school season, etc.), and/or quarter in a fiscal year (e.g., first quarter/Q1, second quarter/Q2, etc.). Additionally, the client application 146 can analyze the email 163 or request configuration information from the email client 149 related to non-date/time factors, such as email importance level (e.g., high importance, low importance, etc.), email security level (e.g., is email encrypted, etc.), email format (e.g., plain text, rich text, HTML, etc.), tracking information (e.g., delivery receipt requested, read receipt requested, voting buttons included, etc.), email expiration, and various other factors. The client application 146 can then compare the attachment categories 129 associated with the unsent email 163 to the attachment categories 129 for each of the templates 126B. In at least one embodiment, the client application 146 can choose a selected template 126 from the templates 126B that has the most shared attachment categories 129 and/or other factors.

At block 516, the client application 146 can populate the body of the unsent email 163 with the selected template 126. The client application 146 can first replace any data tags 136 with specific attachment 169 and/or recipient information, as specified in the template 126 and as previously discussed in the discussion of data tags 136 in FIG. 1. Once the data tags 136 have been replaced, the client application 146 can direct the email client 149 to populate the body of the unsent email 163 with the selected and filled template 126. If the body of the unsent email 163 already contained content, the email client 149 could prompt the user to choose to replace the body of the unsent email 163, add the template 126 to the existing body content, or do nothing.

At block 519, the client application 146 can suggest expected email recipients based on the recipient categories 133 associated with the selected template 126. In at least one embodiment, the client application 146 can communicate with a service that manages user information about recipients, such as the email service 159 or the computing environment data store 123. For instance, the client application 146 can connect to a service or a data store on the computing environment 103 that manages data about the employees for an organization, including their position, their teams, their place in the organizational hierarchy, and much more. The client application 146 can request contacts that match one or more of the recipient categories 133. For instance, the client application 146 can request that such a service provide contacts who are managers of the user of the client device 106. Such a service can find managers for the user of the client device 106 and send the contact information of the manager to the client application 146. The client application 146 can then forward the contact information to the email client 149, which can add the contact to the list of email recipients for the unsent email 163 or suggest adding the contact to the list of email recipients for the unsent email 163. Once the client application 146 has forwarded the contact information to the email client 149 to suggest as an expected recipient, the method of FIG. 5 ends.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system, comprising:
    a computing device comprising a processor and a memory; and
    machine-readable instructions stored in the memory that, when executed by the processor, cause the computing device to at least:
        monitor, by a client application, an email client to identify an unsent email, the unsent email comprising at least a body and an attachment file;
        analyze, by the client application, the attachment file by decoding metadata or contents of the attachment file to determine one or more attachment categories;
        search, by the client application, a client datastore using the one or more attachment categories as input to select an email template from a plurality of email templates;
        populate, by the client application in cooperation with the email client, the body of the unsent email with the selected email template, the client application decoding the selected email template to replace a data tag with a file name of the attachment file;
        identify a recipient of the unsent email; and
        analyze one or more previous emails from the recipient to select a recipient category;
        wherein each of the one or more previous emails comprise a previous email body, and wherein the machine-readable instructions that analyze one or more previous emails from the recipient to select the recipient category is configured to:
        identify an email signature for the recipient from at least one previous email body, wherein the email signature comprises a business title; and
        select at least the recipient category associated with the business title.

2. The system of claim 1, wherein the machine-readable instructions that select the email template from the plurality of email templates further selects the email template based at least on the recipient or the recipient category.

3. The system of claim 1, wherein:
    the attachment file is a first attachment file, the one or more attachment categories are one or more first attachment categories;
    the unsent email further comprises a second attachment file;
    the machine-readable instructions further cause the computing device to at least:
        analyze the second attachment file to determine one or more second attachment categories; and
        compare the one or more first attachment categories and the one or more second attachment categories to determine one or more shared attachment categories; and
    the machine-readable instructions that select the email template from the plurality of email templates based at least on the one of the one or more first attachment categories is configured to at least:
        select the email template based on the one or more shared attachment categories.

4. The system of claim 1, wherein the machine-readable instructions that analyze the attachment file to determine the one or more attachment categories is configured to at least:
    read a file type for the attachment file;
    recognizing, by an optical character recognition service, the attachment file to generate attachment file text content;
    receive the attachment file text content from the optical character recognition service; and
    determine the at least one or more attachment categories by selecting at least one of the file type for the attachment file or a portion of the attachment file text content.

5. A method, comprising:
    monitoring, by a client application executing on a computing device, an email client executing on the computing device to identify an unsent email, the unsent email comprising at least a body and an attachment file;
    analyzing, by the client application, the attachment file by decoding metadata or contents of the attachment file to determine one or more attachment categories;
    searching, by the client application, a client datastore using the one or more attachment categories as input to select an email template from a plurality of email templates;
    populating, by the client application in cooperation with the email client, the body of the unsent email with the selected email template, the client application decoding the selected email template to replace a data tag with a file name of the attachment file;

identifying a recipient of the unsent email; and analyzing one or more previous emails from the recipient to select a recipient category;

wherein each of the one or more previous emails comprise a previous email body, and analyzing one or more previous emails from the recipient to select the recipient category comprises:

identifying an email signature for the recipient from at least one previous email body, wherein the email signature comprises a business title; and selecting at least the recipient category associated with the business title.

6. The method of claim 5, wherein selecting the email template from the plurality of email templates is further based on at least one of the recipient or the recipient category.

7. The method of claim 5, wherein:

the attachment file is a first attachment file;

the one or more attachment categories are one or more first attachment categories;

the unsent email further comprises a second attachment file;

the method further comprises:

analyzing the second attachment file to determine one or more second attachment categories; and comparing the one or more first attachment categories and the one or more second attachment categories to determine one or more shared attachment categories; and selecting the email template from the plurality of email templates based at least on the one of the one or more first attachment categories comprises:

selecting the email template based on the one or more shared attachment categories.

8. The method of claim 5, wherein analyzing the attachment file to determine the one or more attachment categories comprises:

reading a file type for the attachment file;

recognizing, by an optical character recognition service, the attachment file to generate attachment file text content;

receiving the attachment file text content from the optical character recognition service; and determining the at least one or more attachment categories by selecting at least one of the file type for the attachment file or a portion of the attachment file text content.

9. A non-transitory, computer-readable medium, comprising machine-readable instructions that, when executed by a processor of a computing device, cause the computing device to at least:

monitoring, by a client application executing on the computing device, an email client executing on the computing device to identify an unsent email, the unsent email comprising at least a body and an attachment file;

analyze, by the client application, the attachment file by decoding metadata or contents of the attachment file to determine one or more attachment categories;

search, by the client application, a client datastore using the one or more attachment categories as input to select an email template from a plurality of email templates; and populate, by the client application in cooperation with the email client, the body of the unsent email with the selected email template, the client application decoding the selected email template to replace a data tag with a file name of the attachment file;

identify a recipient of the unsent email; and analyze one or more previous emails from the recipient to select a recipient category;

wherein each of the one or more previous emails comprise a previous email body, and wherein the machine-readable instructions that analyze one or more previous emails from the recipient to select the recipient category is configured to:

identify an email signature for the recipient from at least one previous email body, wherein the email signature comprises a business title; and select at least the recipient category associated with the business title.

10. The non-transitory, computer-readable medium of claim 9, wherein the machine-readable instructions that select the email template from the plurality of email templates further selects the email template based at least on the recipient or the recipient category.

11. The non-transitory, computer-readable medium of claim 9, wherein:

the attachment file is a first attachment file, the one or more attachment categories are one or more first attachment categories;

the unsent email further comprises a second attachment file;

the machine-readable instructions further cause the computing device to at least:

analyze the second attachment file to determine one or more second attachment categories; and compare the one or more first attachment categories and the one or more second attachment categories to determine one or more shared attachment categories; and the machine-readable instructions that select the email template from the plurality of email templates based at least on the one of the one or more first attachment categories is configured to at least:

select the email template based on the one or more shared attachment categories.

\* \* \* \* \*